United States Patent [19]

Norris

[11] 4,235,545
[45] Nov. 25, 1980

[54] MICROFICHE CAMERA WITH COOPERATING SHUTTER AND LIGHT SHIELD

[76] Inventor: Philip R. Norris, North Reading, Mass.

[21] Appl. No.: 71,940

[22] Filed: Sep. 4, 1979

[51] Int. Cl.³ .............................................. G03B 1/00
[52] U.S. Cl. ................................... 354/123; 354/147; 354/246
[58] Field of Search .................................. 354/83–86, 354/120, 123, 124, 147, 246; 355/27, 53, 54

[56] References Cited

U.S. PATENT DOCUMENTS

| 620,036 | 2/1899 | Jenkins. | |
|---|---|---|---|
| 3,503,317 | 3/1970 | Johnson. | |
| 3,667,364 | 6/1972 | Mann | 354/123 X |
| 4,027,315 | 5/1977 | Barney | 354/123 X |
| 4,086,604 | 4/1978 | Douglas | 354/246 X |
| 4,140,381 | 2/1979 | Douglas | 354/123 X |

Primary Examiner—John Gonzales
Attorney, Agent, or Firm—John S. Vale

[57] ABSTRACT

A microfiche camera suitable for use in a low cost microfiche system for exposing a plurality of image frame areas on a single card-like film unit. The camera includes a carriage mounted lens that is moved incrementally through linear passes to expose sequential image frame areas disposed in a laterally extending row on the film unit. A shutter that defines an elongated shutter aperture extending along the length of the row cooperates with a light shield, that moves incrementally with the carriage to maintain a shield aperture in operative relation with the lens, for controlling the transmission of scene light to the film unit such that it passes through the lens at each of its sequential imaging positions to expose a corresponding one of the image frame areas, but is blocked from transmission to the other image frame areas in the row during an exposure interval.

10 Claims, 24 Drawing Figures

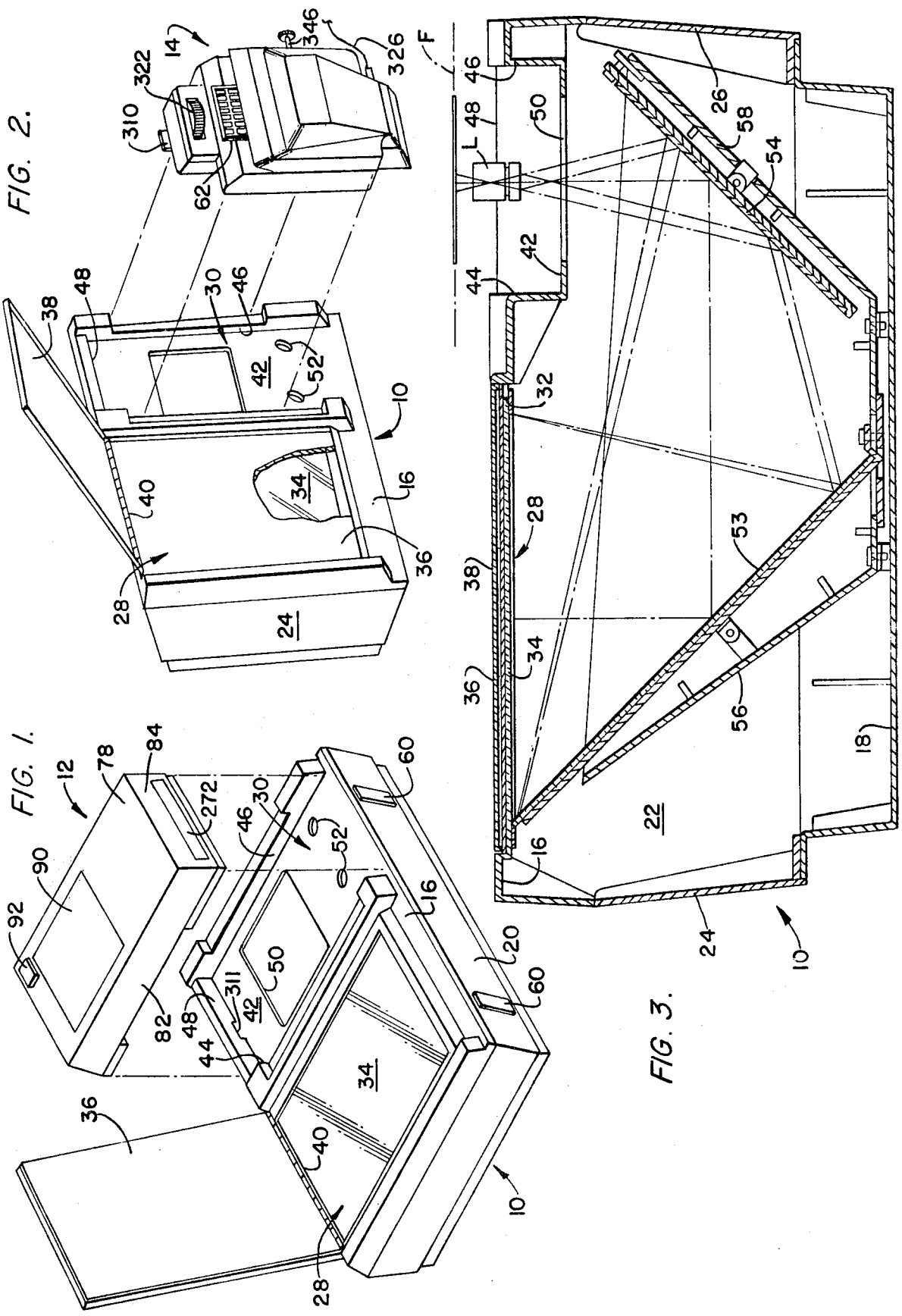

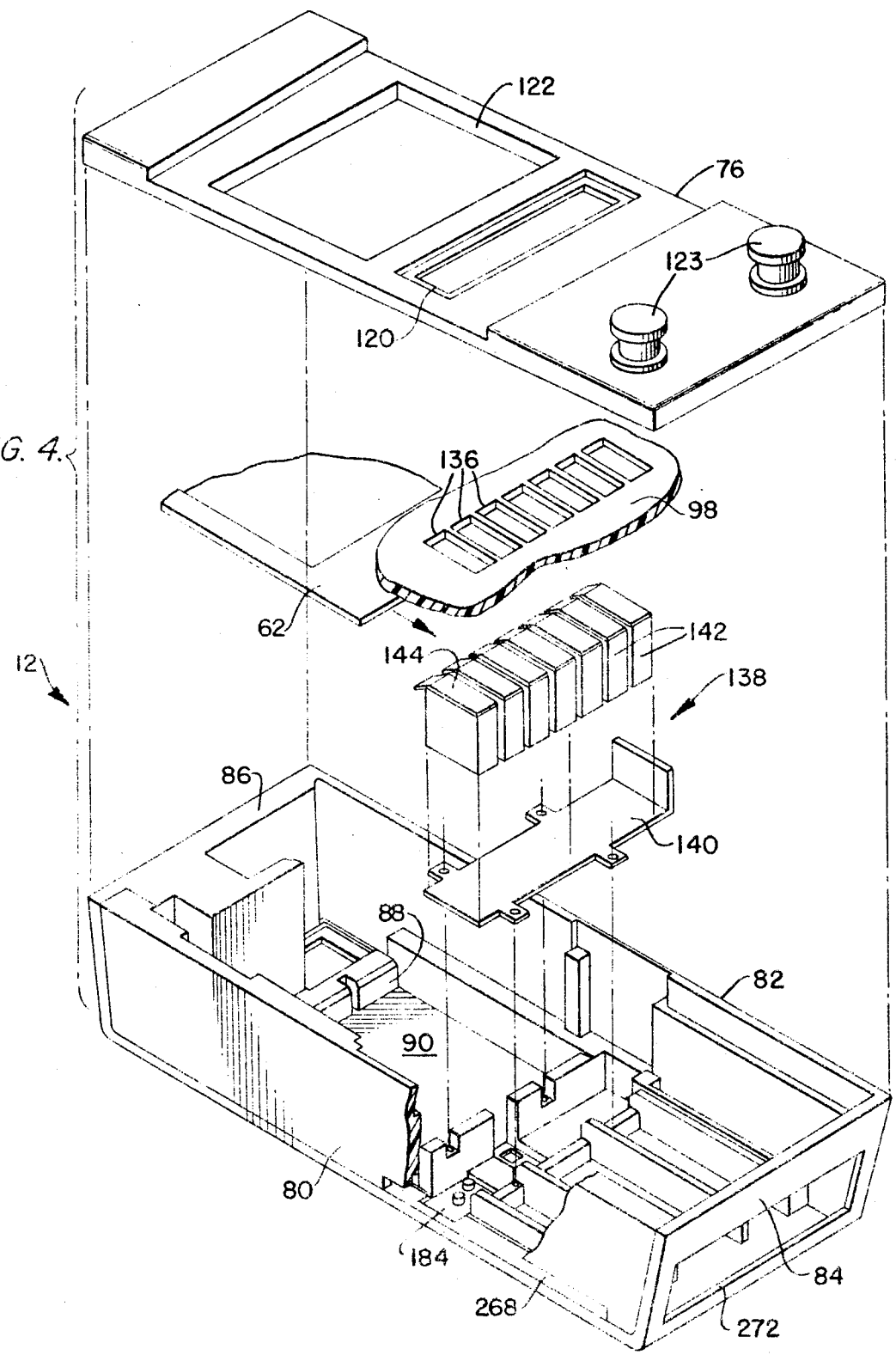

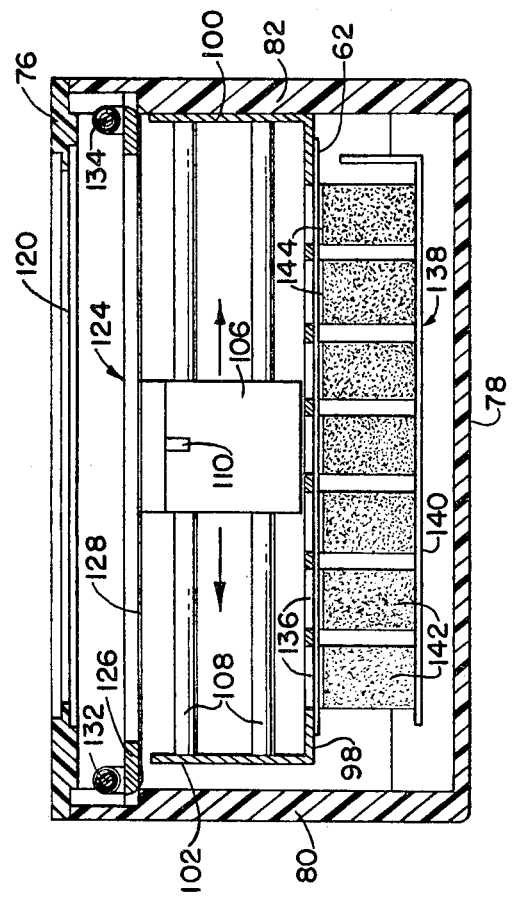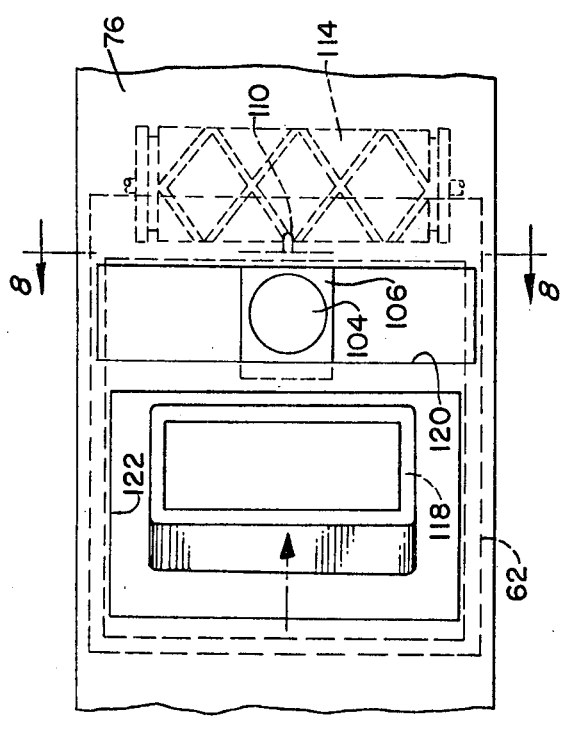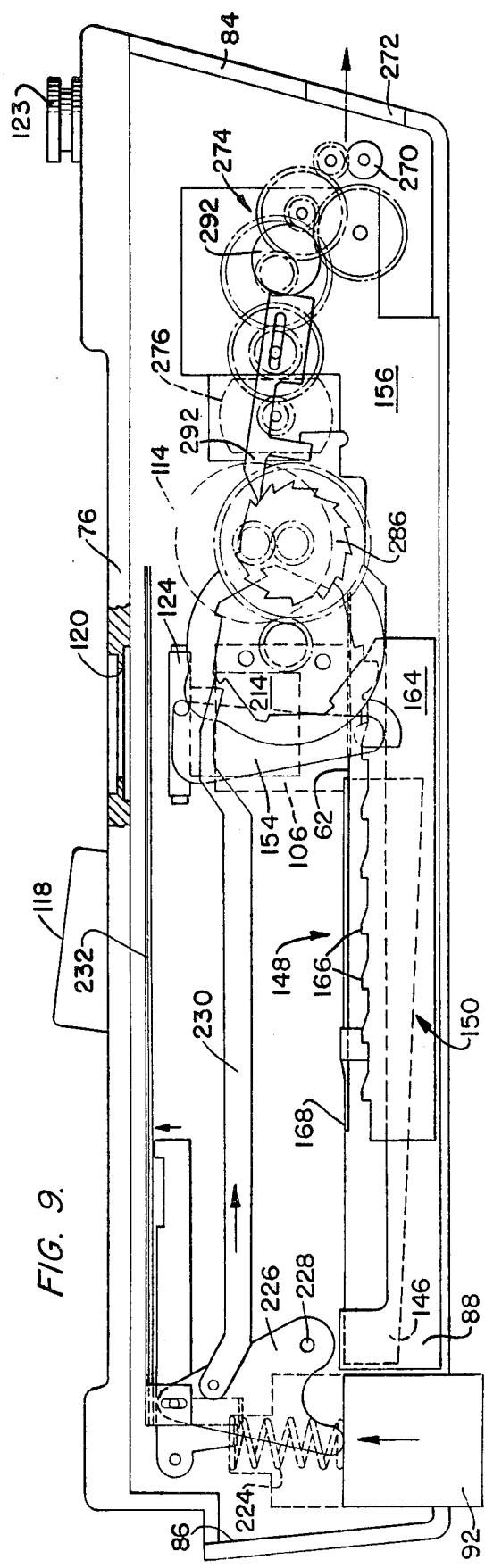

MICROFICHE CAMERA WITH COOPERATING SHUTTER AND LIGHT SHIELD

BACKGROUND OF THE INVENTION

This invention relates to microfilming and, more particularly, it concerns a microfiche camera suitable for use in a low cost microfiche system by which an orderly pattern of micro image frames may be formed on a preassembled, card-like film unit of the type used in instant photography and by which each micro image frame may be subsequently viewed as a projected enlargement.

Presently available microfiche systems involve complex and costly equipment by which documents to be copied are first photographed usually on roll or strip film using a specialized camera. The film is then developed and cut to be mounted on apertured cards on which indicia may be placed for identification of the information recorded on the card mounted film. The microfiche cards are then cataloged and stored for subsequent sorting and retrieval of the recorded information by viewing, copying or the like. The facility provided for such systems for space conservation, permanence and automated retrieval of recorded information have made such systems highly cost effective to large business firms and governmental institutions where equipment costs can be justified by large volumes of information to be stored.

Because of equipment costs and need for highly trained personnel, most small and moderately sized business establishments can make use of a microfiche system only by contracting with specialized microfilming firms at least for the photographing and microfiche assembly phases of the recording procedure. The potential presented to such establishments, however, for less than complete integrity of the microfiche records, loss of security control over confidential information, disruption of normal business activities and the like can and often are a deterrent to the use of microfiche capabilities. It is believed, therefore, that a need exists for an economical and simply constructed camera suitable for use in a low cost, easily operated microfiche system by which the recording and retrieval of information may be made available on a routine basis to firms and businesses which cannot justify the investment of capital and personnel training required of existing microfiche systems.

The microfiche system is of the type described and claimed in commonly assigned copending application U.S. Ser. No. 071,939 filed on even date herewith and entitled "Microfiche System".

SUMMARY OF THE INVENTION

In accordance with the present invention, a microfiche camera is provided which is suitable for use with a microfiche projector and console to form a low cost microfiche system wherein the format of a conventional self-developing film unit is used as a card on which a plurality of micro image frames may be recorded and viewed. The console includes a combination camera/projector mount for alternatively receiving the camera to record micro images of a plurality of documents supported successively on a console document mounting glass, or the projector to project recorded images onto a console image display screen.

The camera embodying the present invention is configured to record an orthogonal pattern of micro image frames disposed in rows and columns on such a film unit. The rows are formed by indexing or incrementally advancing a carriage mounting a lens through linear passes laterally across the film unit and transmitting scene light through the lens at each lateral step to expose a linear row of successive image frame areas on the film unit. After each linear pass, the film unit is advanced one row increment longitudinally relative to the lens in preparation for exposing the next parallel row of image frame areas. Successive rows of image frames then define the longitudinal columns.

More particularly, the present invention provides such a camera having cooperable means in the form of a shutter and a light shield that moves incrementally with the lens carriage for controlling the transmission of scene light so that it passes through the lens at each of its sequential imaging positions to expose a corresponding one of the image frame areas but is blocked from transmission to the other image frame areas in the row.

Accordingly, the camera includes a lens carriage mounting the lens for incremental movement to bring the lens into imaging relation with successive image frame areas disposed in a row on the film unit; a shutter for defining a reclosable elongated shutter aperture extending along the length of the row to permit transmission of scene light for exposure of each of the image frame areas during an exposure interval; and a light shield having an aperture therein and being mounted for incremental movement with the lens carriage to maintain the shield aperture in operative relation with the lens to thereby restrict scene light transmitted through the shutter aperture to one of the image frame areas having the lens in imaging relation therewith and block the transmission of such light to the other image frame areas during the exposure interval.

The shutter preferably includes opening and closing shutter blades that each have elongated openings therein. The blades are normally located in an initial position with their openings out of alignment to define a closed shutter condition. From the initial position the blades are moved together to a cocked position where the closing blade is latched. The opening blade is then moved back to the initial position so that the blade openings are aligned to define the shutter aperture for transmitting scene light. The opening blade then releases the latch and the closing blade returns to the initial position to terminate exposure.

In a preferred embodiment the light shield includes a flexible light opaque apron coupled to the carriage for movement therewith, with the shield aperture about the lens, and a pair of rollers at the ends of the apron on which the apron is wound and unwound respectively in response to such movement of the apron.

Also, the camera may additionally include a source of exposure illumination, such as an electronic strobe unit, and at least one of the blades may be provided with an actuator for actuating the illumination source when the blades are positioned to define the shutter aperture.

Therefore it is an object of the present invention to provide an economical and simply constructed camera suitable for use in a low cost microfiche system and including a carriage mounted lens that is moved in increments to expose a plurality of image frame areas on a single card-like film unit.

Other objects of the invention include: the provision of such a camera having a cooperable shutter and a light shield, that is movable with the carriage, for controlling the transmission of scene light to the film unit so that it passes through the lens at each of its sequential imaging positions but is not transmitted to other image frame areas in a laterally extending row; the provision of such a camera wherein the shutter includes opening and closing blades that cooperate to define an elongated shutter aperture extending along the length of the row to permit transmission of scene light to each of the image frame areas therein; and the provision of such a camera wherein the light shield includes a flexible apron coupled to the carriage for movement therewith with a shield aperture about the lens and a pair of rollers at the ends of the apron on which it is wound and unwound in response to apron movement.

Other objects and further scope of applicability of the invention will be apparent from the detailed description to follow taken in conjunction with the accompanying drawings in which like parts are designated by like reference numerals.

BRIEF DESCRIPTION OF THE DRAWINGS

FIG. 1 is an exploded perspective view illustrating the console and camera of the present invention used in the microfiche system;

FIG. 2 is a similar exploded perspective view illustrating the console and the projector of the system;

FIG. 3 is an enlarged cross-sectional view of the console illustrated in FIGS. 1 and 2;

FIG. 4 is an exploded perspective view illustrating camera housing components;

FIG. 7 is a fragmentary plan view illustrating the front face of the camera of the invention;

FIG. 8 is a cross-section on line 8—8 of FIG. 7;

FIG. 9 is a side elevation of the camera with one sidewall panel thereof removed;

DETAILED DESCRIPTION OF THE PREFERRED EMBODIMENTS

Figure 5:
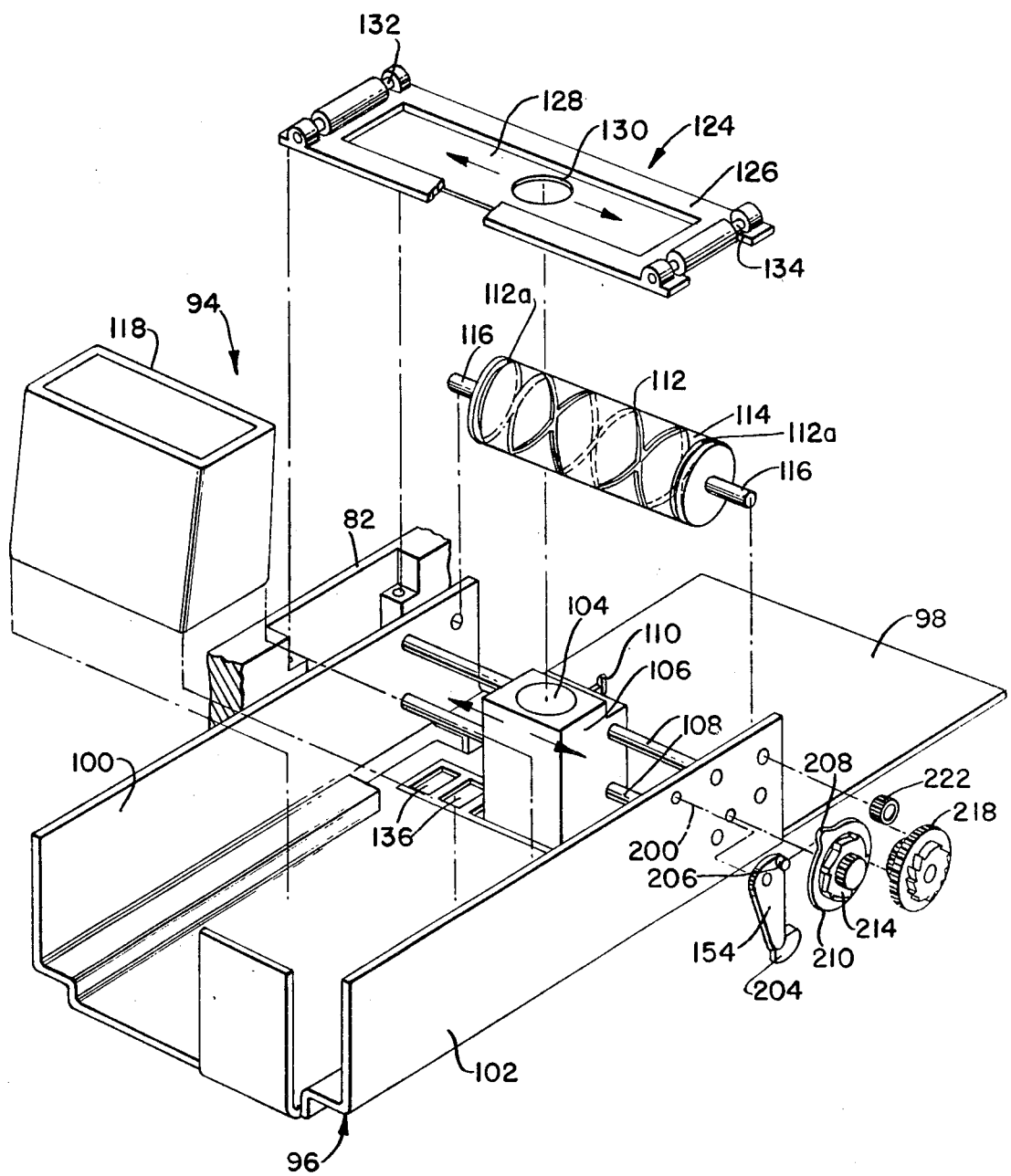
FIG. 5 is an exploded perspective view illustrating exposure components of the camera.

In FIGS. 1–3 of the drawings, primary components used in the microfiche system are shown to include a console 10, a camera 12 of the present invention and a projector 14. Although details of the camera 12 and projector 14 are illustrated more completely in other drawing figures to which reference will be made in the description to follow, it will be seen in FIGS. 1–3 that the console 10 is constituted by a box-like enclosure having top and bottom walls 16 and 18, front and rear walls 20 and 22 and sidewalls 24 and 26, respectively.

Provided in side-by-side relationship in the top wall 16 of the console is a combination document mounting and image display area, generally designated by the reference numeral 28, and a camera/projector mount 30. The mounting and display area 28 is more particularly constituted by a rectangular opening 32 in the top wall 16 in which a transparent document mounting glass 34 is fixedly supported. Also supported from the top wall to overlie the glass 34 is a hinged image display screen 36 and a hinged cover 38. Though not illustrated as such in the drawing, the screen 36 is translucent or frosted and preferably incorporates Fresnel lens on one surface. The screen 36 and the door or cover 38 are shown pivotally mounted at the rear edge of the opening 32 by a common hinge 40.

The camera/projector mount 30 is in the nature of a well in the top wall 16 to provide a generally planar well floor 42 circumscribed on three sides by a pair of sidewalls 44 and 46 joined by a rear wall 48. The floor 42 is provided with a rectangular window 50 and a pair of latching apertures 52 by which either the camera 12 or projector 14 may be latched in the mount 30 in a manner to be described.

As shown most clearly in FIG. 3, the interior of the console 10 supports reflective means, specifically a pair of mirrors 53 and 54 by which a coherent light image may be transmitted between the mounting and display area 28 and the region of the mount 30. The mirrors 53 and 54 are adjustably supported by brackets 56 and 58, respectively, so that an image presented at the mounting and display area 28 may be transmitted to or from the focal plane F of a lens L aligned with the window 50 in the mount floor 42.

It will be noted that the front wall 20 of the console 10 is inclined upwardly and forwardly from the bottom wall 18 and carries a pair of spaced mounting feet 60 on its exterior. The console 10 may be supported on the bottom wall 18 for photographing documents situated on the transparent mounting glass 34 when the camera 12 is received in the mount 30, all as depicted by FIG. 1 of the drawings. As illustrated in FIG. 2, when the projector 14 is received in the mount 30, the console 10 may be tilted forwardly to be supported by the feet 60. This feature not only facilitates document image display on the screen 36 to one seated at a table, for example, on which the console 10 is supported, but also the cover 38, when swung upwardly to the position shown in FIG. 2, functions as a light shield for the screen 36 to which a document image is projected for viewing. In this respect, the cover hinge 40 may be provided with appropriate spring means (not shown) for retaining the cover 38 in the position shown in FIG. 2.

The camera 12 embodying the present invention is of the type having certain of its aspects relating to camera actuation and lens and film transport described and claimed in commonly assigned copending application U.S. Ser. No. 072,051 filed on even date herewith and entitled "Microfiche Camera With Lens And Film Transport System".

Structural details of the camera 12 are illustrated in FIGS. 4–19 of the drawings. An understanding of the camera 12 and its operation, however, will be facilitated by reference first to FIGS. 20 and 21 which illustrate the format and construction of a film unit or microfiche 62 to be recorded by the camera. As shown in these figures, the construction of the microfiche 62 is essentially identical to photographic film units available commercially under the trade designation "POLAROID SX-70 LAND FILM" from Polaroid Corporation, Cambridge, Massachusetts. As such, the microfiche 62 has an image receiving area defined by a pair of polyester sheets 64 and 66 retained in superimposed coextensive relationship by a frame 68 of such material as paper or foil. One marginal edge 70 of the frame is relatively wide to house or enclose a pod 72 of processing fluid which is spread uniformly over one or more layers of photochemical materials (not shown) sandwiched between the sheets 64 and 66 upon passage of the unit 62 through the nip of a pressure roller pair as is now well known in the art. In the conventional film unit, the sheet 66 is opaque as an incident to providing a positive photographic print and for other reasons. In the microfiche 62, however, both polyester sheets 64 and 66 are transparent. In addition, the photochemical material between the sheets 64 and 66 is designed so that when processed, it provides a negative image transparency of a type conventionally employed in the microfilming art.

Figure 20:
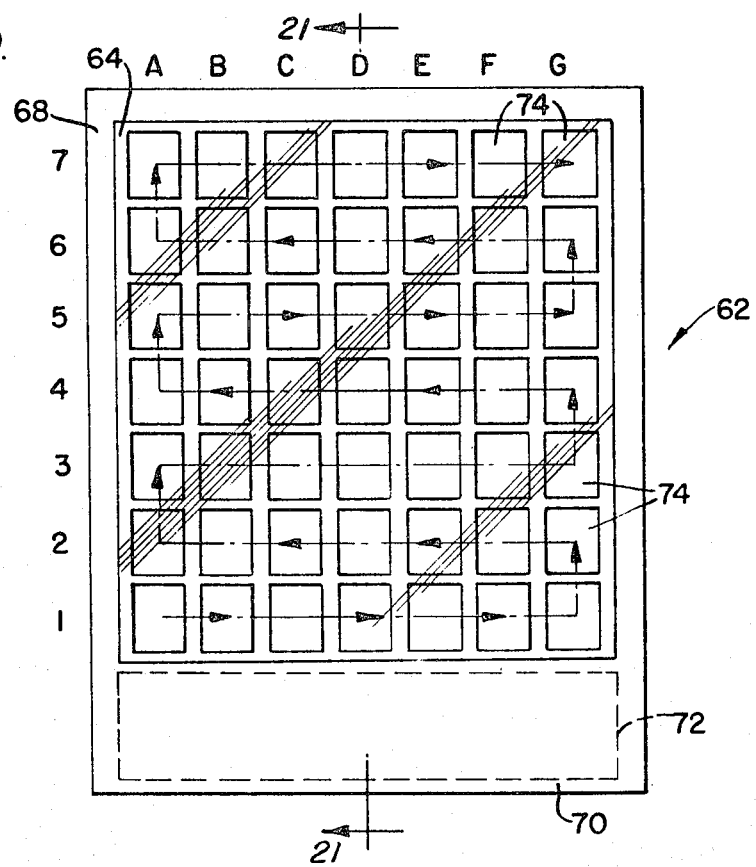
FIG. 20 is a plan view of a film unit used in the microfiche system.
Figure 21:
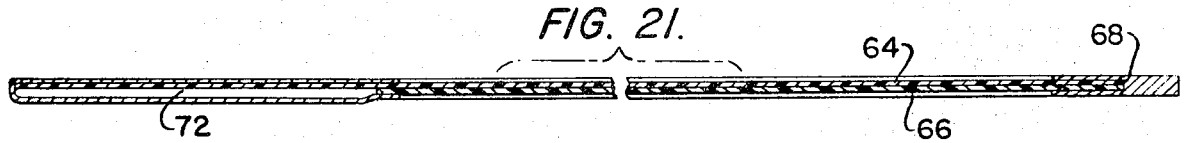
FIG. 21 is an enlarged fragmentary cross-section on line 21—21 of FIG. 20.

As shown in FIG. 20, the image receiving area of the microfiche 62 may be subdivided to provide forty-nine micro image areas or frames 74 arranged in several lateral rows designated 1–7 and seven longitudinal columns designated A–G. The manner in which the frames 74 are recorded by the camera 12 in conjunction with the console 10 and viewed using the projector 14 either alone or also in conjunction with the console 10 will be understood from the description to follow.

Although the camera 12 is oriented in use so that it faces downwardly as shown in FIG. 1, the illustration of the camera and the components thereof in FIGS. 4–19 are inverted in the interest of providing drawing clarity and consistency of illustrated component orientation. As may be seen in FIGS. 1 and 4, therefore, the camera includes an exterior housing constituted by generally rectangular front and back walls 76 and 78, sidewalls 80 and 82 and end walls 84 and 86, respectively. A film pack well 88 is accessible through a hinged door 90 which opens from the back wall 78. Also, an actuating button 92 is presented in the back wall 78 between the door 90 and the corner joining the back wall 78, the sidewall 80 and the end wall 86.

As shown most clearly in FIG. 4, the major portion of the camera housing is provided by an integral molding of the back wall 78, the sidewall 82 and end walls 84 and 86. The sidewall 80 and the front wall 76 are separate panel moldings for purposes of camera component assembly as will be seen from the description to follow.

The interior of the back wall 78, sidewalls 82 and end walls 84 and 86 are shaped to receive a fixed gate assembly generally designated by the reference numeral 94 and shown most clearly in FIGS. 5 and 8. The assembly 94 includes a channel-like support member 96 of metal or other material possessing the strength and machining characteristics of metal to provide an essentially planar guide plate 98 and a pair of upstanding side flanges 100 and 102. An objective lens 104 is mounted in a lens carriage 106 in turn supported for lateral sliding movement on a pair of parallel guide rods 108 supported at their ends in the flanges 100 and 102. The lens carriage includes a cam follower 110 adapted to engage in a double helix cam groove 112 formed in a rotatable barrel cam 114. The barrel cam includes a pair of stub axles 116 at opposite ends to be journalled in the flanges 100 and 102. An electronic strobe lamp 118 and associated electronic circuitry (not shown) is adapted to be received in the fixed gate assembly 94 between the flanges 100 and 102 and between the lens carriage 106 and the end wall 86.

As may be seen in FIGS. 4, 5 and 7–9, in the assembled camera, the lens 104 is positioned to be aligned with a rectangular exposure window 120 in the front wall panel 76 whereas the strobe lamp 118 will be positioned in a relatively large rectangular window 122, it being understood that the combined area occupied by the face of strobe unit 118 and the exposure window 120 will fit within the area of the rectangular window 50 in the floor of the mount 30 in the console 10 (FIG. 1). Mounting lugs 123 project from the front wall 76 to register with the latching apertures 52 and thus assure correlation of camera components with the mount 30 of the console 10.

In a preferred embodiment, the exposure window 120 is covered by a first polarizing filter (not shown) and the rectangular window 122 for strobe unit 118 is covered by a second polarizing filter (not shown) that has its plane of polarization crossed with respect to the plane of polarization of the first filter. These filters are provided to substantially reduce glare in the optical path to lens 104 caused by the back reflection of strobe light from the document mounting glass 34.

Positioned between the front wall 76 and the top of the lens carriage 106 is a light shield or blind assembly 124 (FIG. 5). The assembly 124 includes a light shielding frame 126 adapted to be secured in the sidewalls 80 and 82 in a position to lie slightly forward of the plane of the forwardly (upwardly in FIGS. 4–19) presented end surface of the lens carriage 106. The frame 126 supports along its length, a light shielding apron 128 having an aperture 130 adapted to register with the lens 104 by securement of the apron 128 directly to the lens carriage 106. Opposite ends of the apron 128 are wound in convolutions about rollers 132 and 134 journalled in the frame 126. Preferably, the apron 128 is formed of resilient material such as stainless steel foil prestressed so that it will pay in and out of the wound convolutions on the rollers 132 and 134 by itself as the aperture 130 is moved transversely with the carriage 106. Though not shown in the drawings, appropriate labyrinth or other types of light seals will be provided to restrict passage of light through the exposure window 120 to that which passes the opening 130 in the apron 128.

As may be seen in FIGS. 4, 5 and 8, the guide plate 98 is provided with a plurality of framing gate apertures 136 extending laterally of the assembly 94 and with which lens 104 is brought into imaging relation sequentially as carriage 106 traverses the guide rods 108. In the illustrated embodiment, seven such framing gate apertures 136 are provided and correspond to the columns A–G mentioned above with respect to the microfiche 62 in FIG. 20.

Positioned behind the guide plate 98 is a film pressure plate assembly 138. The assembly 138 includes a mounting plate 140 adapted to be secured against the interior of the back wall 78 and supporting a plurality of pressure pads 142 in a position to underlie the framing gate apertures 136. Each of the pressure pads 142 is comprised of a block of foam-like material secured by adhesive to the mounting plate 140 and carrying at its forwardly disposed end a low friction cap 144 of polyester film or similar material.

As may be seen in FIGS. 4 and 7-9 of the drawings, the film pack well 88 is designed to receive a film pack 146 containing a plurality of the microfiche cards or film units 62 and presenting the film units so that the uppermost unit in the pack 146 will lie against the back of the guide plate 98. By means to be described in more detail below, the film unit or microfiche 62 thus lying against the back of the plate 98 will be fed forwardly toward the end wall 84 in the plane of the back surface of the guide plate 98 between the friction caps 144 of the pressure pads 142 and the framing gate apertures 136. In this way, the photosensitive chemicals between the polyester sheets 64 and 66 of the unit 62 will be retained precisely in the focal plane of the lens 104.

In FIGS. 6, 9 and 17-19, an incremental film unit advance mechanism, generally designated by the reference numeral 148, is shown to include a pick assembly 150, a brake 152 and a drive lever 154. As shown most clearly in FIG. 6, the pick assembly 150 is positioned for longitudinal movement between a pick retaining plate 156, adapted to be secured by tabs 158 to the back side of ledge formations 160 on the interior of the sidewall panel 80, and the sidewall 80. In addition, a longitudinal slot 162 in the back wall 78 positions the pick assembly 150 for rectilinear fore and aft movement within the camera interior.

The pick assembly 150 is constituted by a plate-like pick slide 164 having ratchet teeth 166 on its forwardly projecting edge and carrying a film unit engaging hook or pick 168 near its rear end. A bracket 170 projects laterally from the front end of the slide 164 on the side thereof opposite from the side on which the hook 168 is mounted. The bracket includes a foot-like handle 172 and a return spring tab 174 from which an elongated tension spring 176 extends to an anchorage in the camera housing. Also, a brake release pin 180 projects from the pick slide 164 at the rear end thereof and on the same side as the bracket 170.

Figure 6:
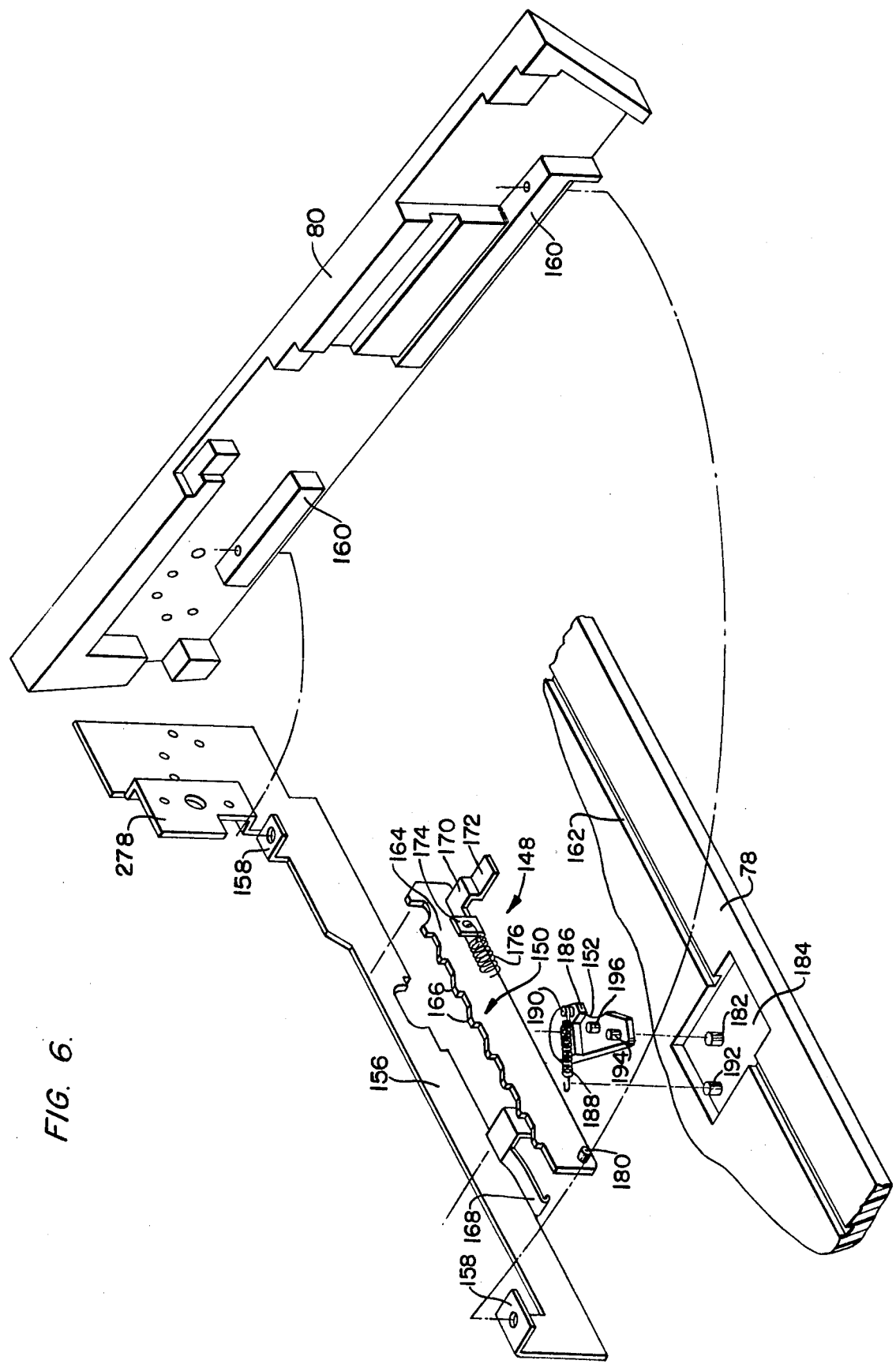
FIG. 6 is an exploded perspective view illustrating the components of a film unit advance mechanism incorporated in the camera of the invention.
Figure 10:
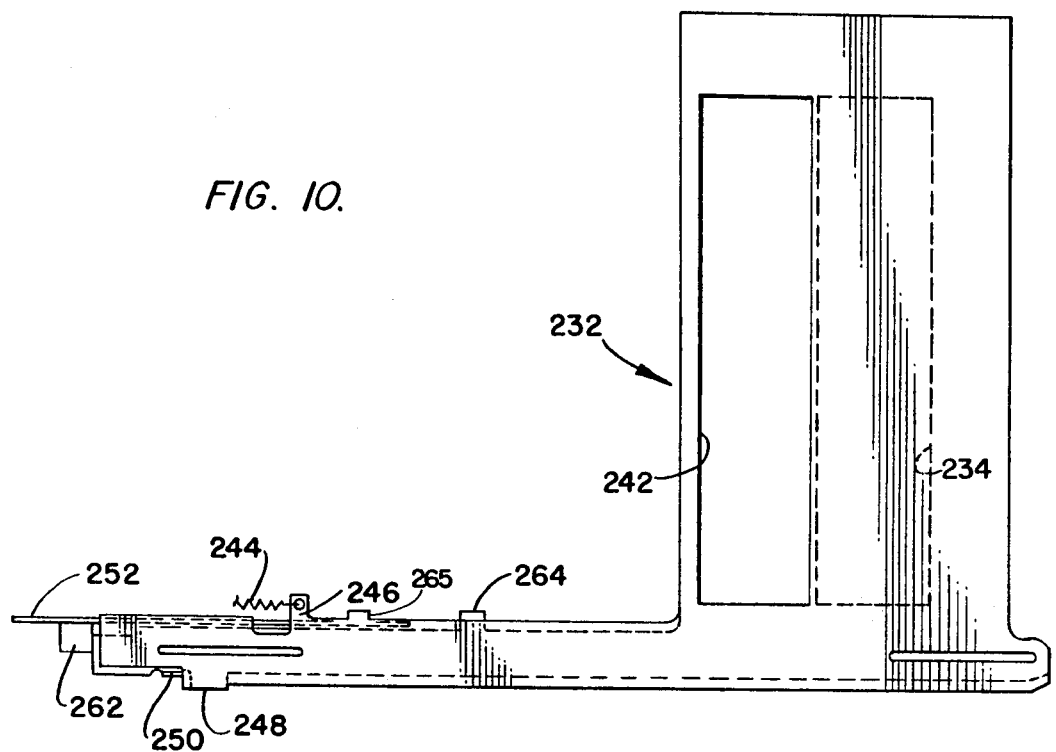
FIG. 10 is a plan view illustrating a shutter mechanism incorporated in the camera of the invention.
Figure 11:
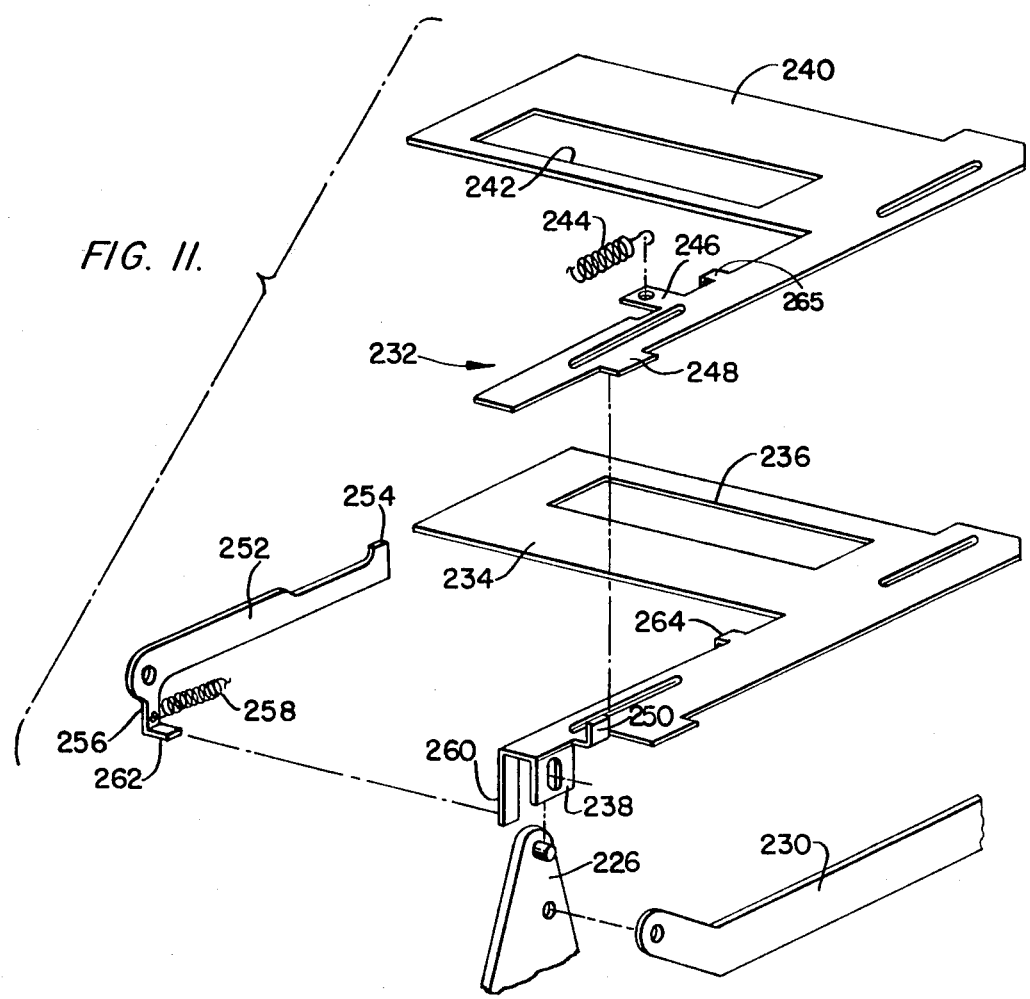
FIG. 11 is an exploded perspective view of the components used in the shutter illustrated in FIG. 10.
Figure 12:
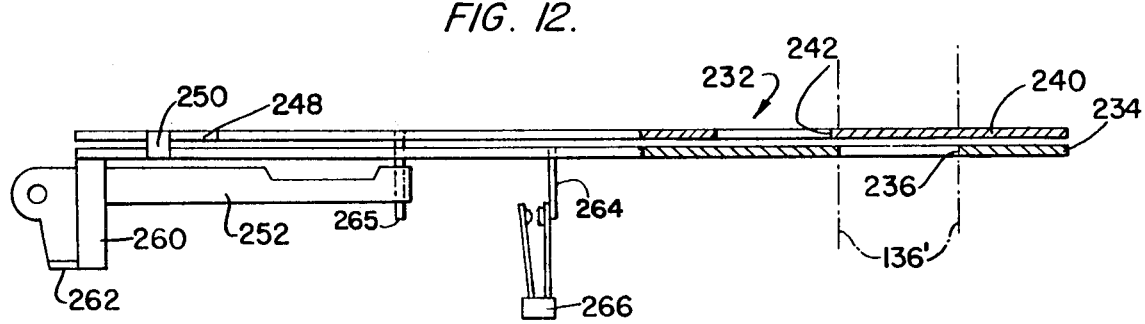
FIGS. 12–16 are schematic side elevations in partial cross-section illustrating the operation of the shutter shown in FIGS. 10 and 11.
Figure 13:
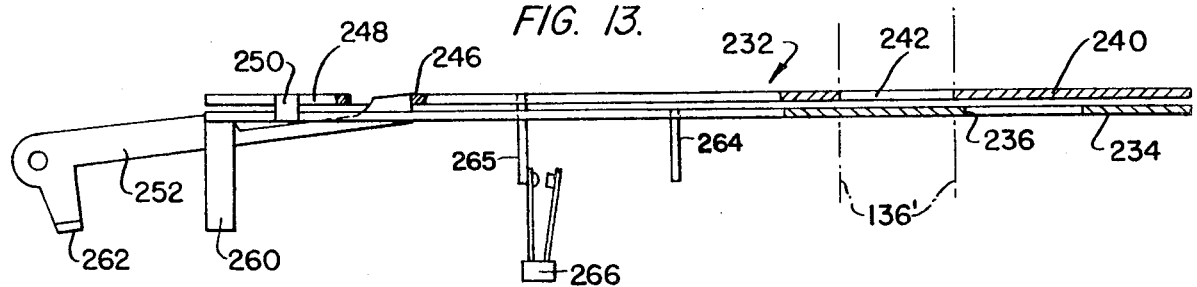
Figure 19:
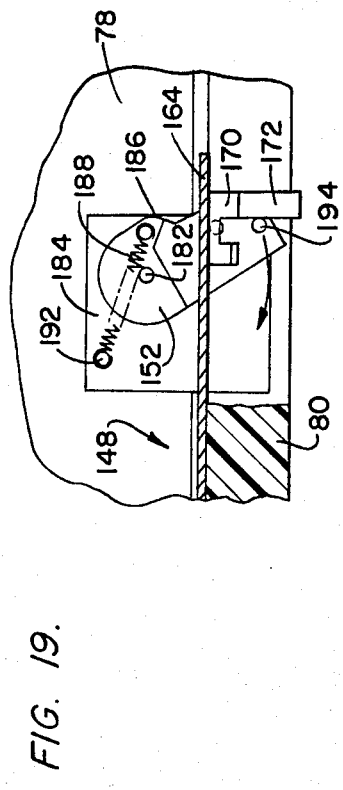
FIG. 19 is an enlarged fragmentary cross-section similar to FIG. 18 but illustrating components in a different condition of operation.
Figure 18:
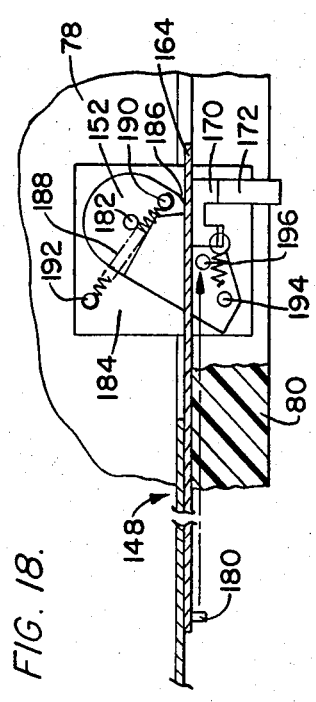
FIG. 18 is an enlarged fragmentary cross-section on line 18—18 of FIG. 17.

As shown most clearly in FIGS. 6, 18 and 19, the brake 152 is in the nature of a plate pivoted on a post 182 in a brake well 184 formed in the back wall 78. The brake includes an upstanding arcuate braking surface 186 eccentric with respect to the axis of the pivot post 182 and arranged to wedge the pick slide 164 against the sidewall panel 80 and the outer side surface of the groove 162 in the back wall 78. A tension spring 188 extending between a post 190 adjacent the arcuate braking surface 186 and a post 192 fixed in the well 184 biases the brake toward an engaging position so long as the spring is aligned on the same side of the pivot post 182 as the surface 186. The brake 152 carries a pair of upstanding posts 194 and 196 in a position to be opposite of the pick slide 164 from the pivot post 182. The post 196 is positioned to be aligned with the brake release pin 180 carried by the slide 164 so that at the forward end limit of travel, the pin 180 will engage the brake post 196 to pivot the brake 152 until the spring 186 passes over the pivot post 182. After the spring passes a dead-center position in alignment with the pivot post 182, it will swing the brake to the position shown in FIG. 19 in which the arcuate braking surface 186 clears the pick slide 164. When the pick slide 164 is returned by the spring 176, the foot 172 on the bracket 170 will engage the post 194 on the brake 152 to return the brake 152 to an active or operative position. The brake 152 will, therefore, retain the pick slide 164 against the spring 176 and in the position to which it is advanced by the drive lever 154 in a manner to be described.

Figure 17:
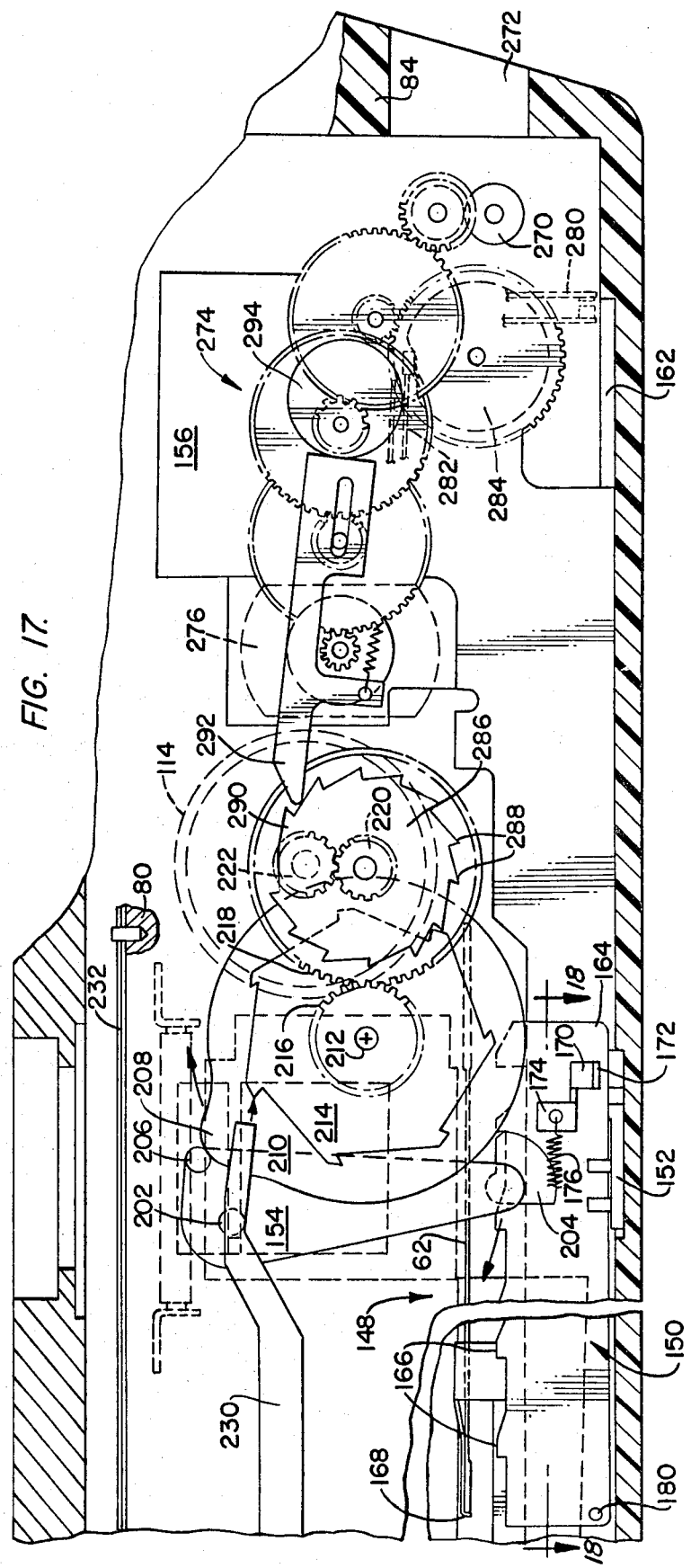
FIG. 17 is an enlarged fragmentary side elevation similar to FIG. 9.

As shown in FIGS. 5 and 17 of the drawings, the drive lever 154 is pivoted about an axis 200 by a pivot shaft 202 supported in the flange 102 of the fixed gate assembly support member 96. The drive lever supports a pivotal pawl 204 at one end in a position to engage the teeth 166 on the pick slide 164 and carries a cam follower 206 projecting from the outside thereof at a position spaced from the pawl 204 and the pivot 202. The follower 206 is positioned to be engaged by a cam lobe 208 on a cam wheel 210 rotatable about an axis 212 and supported by the flange 102. The cam wheel 210 carries a drive ratchet 214 and a gear 216. As shown in FIG. 17, the gear 216 meshes with a reset ratchet gear 218 having a relatively small drive gear 220 in mesh with a pinion gear 222 keyed to the barrel cam 114.

As shown in FIG. 9, the actuating button 92 is depressable manually against a return spring 224 and a bell crank lever 226 pivoted on a post 228. The bell crank lever 226 is pivotally connected to an elongated drive pawl 230 located to engage the drive ratchet 214. From the organization of components illustrated in FIGS. 9 and 17, therefore, it will be appreciated that the drive pawl 230 will be actuated each time the push button 92 is depressed to rotate the drive ratchet 214 and cam wheel 210 the increment of one tooth spacing on the drive ratchet 214. A combination of drive ratio in the gearing 216, 218, 220 and 222 will rotate the barrel cam 114 so that the cam track 112 thereon will advance the lens carriage 106 laterally by a suitable distance to bring it into proper imaging relation with each of the framing gate apertures 136 in the guide plate 98.

From the foregoing, it will be appreciated that the lens carriage 106 may be advanced through seven lateral increments as a result of the seven teeth on the drive ratchet 214. Also, it will be appreciated that the cam wheel 210 will be rotated through one revolution for each seven strokes of the drive pawl 230 and that the cam lobe 208 will actuate the drive lever 154 once for each complete revolution of the cam wheel 210.

With reference again to FIGS. 5 and 20, it will be noted that assuming an appropriate initial positioning of the film unit 62 behind the framing gate apertures 136 so that these apertures register with a lateral area or strip corresponding to Row #1, the lens 104 will be successively positioned at each column A through G for each rotational increment of the cam wheel 210 and drive ratchet 214. In this respect, and as shown in FIG. 5, the double helix cam track 112 terminates at opposite ends in dwell sectors 112a which extend partially around the periphery of the barrel cam 114 without pitch or axial throw. Thus while the follower 110 of the lens carriage 106 is located in the dwell sectors 112a, no lateral movement of the carriage 106 will occur throughout that increment of rotation in the drive ratchet 214 during which the cam lobe 208 actuates the drive lever 154 to advance the pick slide 164 through a longitudinal increment of film unit movement. As a result, the carriage and lens will remain aligned with Column A or Column G while the film unit 62 is shifted longitudinally between consecutive rows. Thus, the cam track 112 and incremental advance of the pick slide 164 by the drive lever 154 at the end of each Row #1-7, will cause the lens 104 to traverse the path of image frame areas 74 in oppositely directed, lateral passes as represented by the dashed arrow in FIG. 20.

It should be noted that when lens 104 is moved to bring it into imaging relation with gate apertures 136 on either side of the middle gate aperture 136 it is displaced slightly from an optical centerline running to the object plane defined by document mounting glass 34. This may cause the image formed by lens 104 at the off center gate apertures 136 to suffer from perspective distortion.

To alleviate this problem, cam 114 may be configured so that lens 104 is centered with respect to the middle gate aperture 136 but is slightly decentered with respect to the other gate apertures 136 to compensate for such distortion.

Exposure of the film unit at each of the micro image frames 74 illustrated in FIG. 20 is effected by a shutter 232 operated in conjunction with the strobe unit 118. Although the relative location of the shutter 232 is illustrated in FIGS. 9 and 17 of the drawings, details of this mechanism are illustrated most clearly in FIGS. 10–16 of the drawings. As shown in these latter figures, the shutter 232 includes an opening blade 234 having a rectangular opening 236 and a slotted bracket 238 secured to the bell crank lever 226 in a manner to be moved therewith. A closing blade 240 having a rectangular opening 242 overlies the opening blade 234 and is biased to a rearward position by a spring 244 extending from a fixed anchorage in the camera housing to a tab 246. The closing blade 240 also includes a lateral abutment tab 248 positioned to be engaged by an upstanding tab 250 on the opening blade 234. A latch bar 252 having a latching tang 254 at one end and a depending arm 256 at the other end is biased by a spring 258 toward a position in which the end 254 will engage the tab 246 on the closing blade 240. A depending post 260 on the opening blade 234 is positioned to engage a tang 262 on the latch bar 252. Also, a depending switch tab 264 is provided on the opening blade 234 and a complementary switch tab 265 is provided on closing blade 240. Operation of the shutter will be apparent from the sequence of shutter blade positions illustrated in FIGS. 12–16 in which the position of the framing gate apertures 136 is represented by the dashed lines 136'. Also, a switch 266 for actuating the circuitry (not shown) of the strobe lamp 118 is illustrated schematically in these figures.

Figure 14:
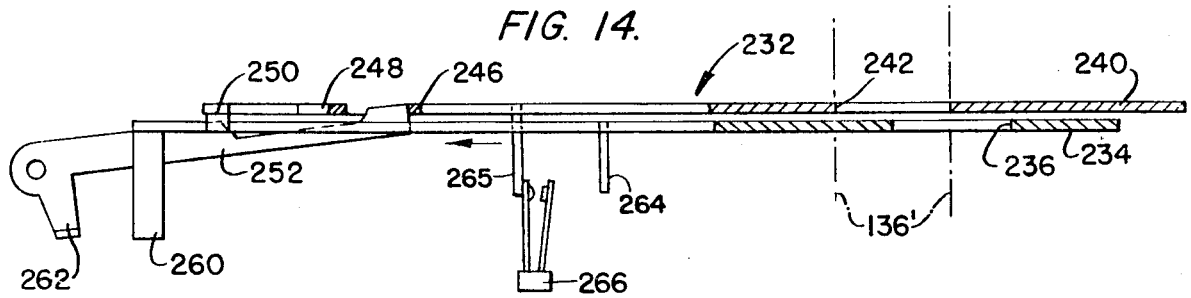
Figure 15:
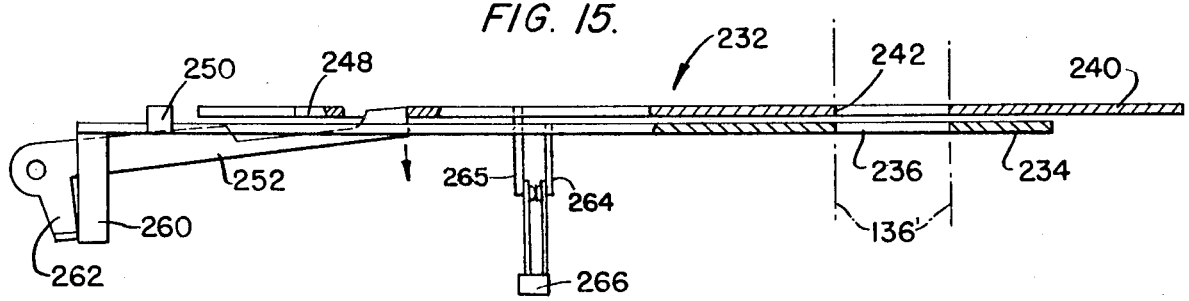
Figure 16:
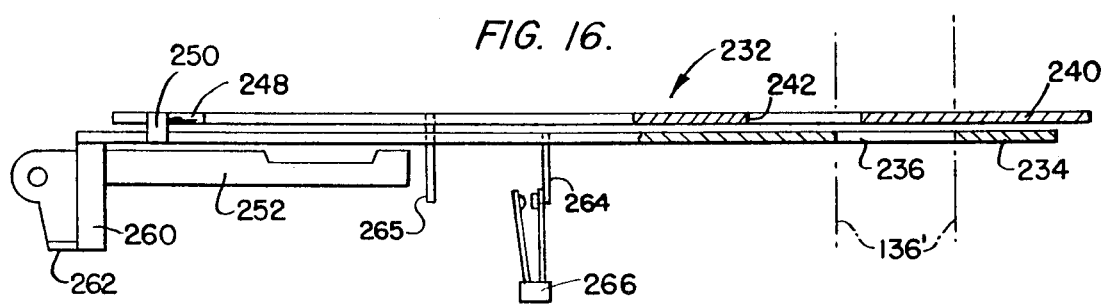

In FIGS. 12–16 it will be observed that in the initial position (FIG. 12), the closing blade 240 is biased by the spring 244 to its rearward most position. Also, the depending tab 260 on the opening blade 234 retains the latch 252 in a disengaged condition. As the actuating button 92 is depressed, the opening blade 234 moves forward, carrying with it the closing blade 234 as a result of the tab 250 engaging the tab 248. When the button 92 has been depressed fully, the blades occupy the position shown in FIG. 13 in which the opening 242 of the closing blade 240 is aligned with the framing gate apertures 136 and thus with the lens 104. Also in this condition, the latch bar 252 moves into engagement with the tang 246 on the closing blade to retain it in the position shown in FIGS. 13–15. When the push button 92 is released, the opening blade begins to return as shown in FIG. 14 and when the openings 242 and 236 come into complete registry (FIG. 15) the tabs 264 and 265 close switch 266 to fire the strobe and the depending tab 260 engages the tab 262 on the arm 256 to disengage the latch 252. Thereafter the closing blade 240 returns to its original position (FIG. 16) to complete the shutter operation. It is to be noted that the primary exposure at each micro image frame is determined by the strobe so that it is necessary only that the blades remain open for a long enough period of time for the exposure to occur. Also, it will be noted that the openings 236 and 242 in the shutter blades are coextensive with all of the framing gate apertures 136. Because of the apron blind 128, however, only that film portion behind the aperture 136 aligned with the lens 104 will be exposed.

It will be observed that each of the camera mechanisms identified thus far are mechanically interrelated to be operated by a manual force applied to the actuating button 92. Also, the handle 172 on the pick slide mounted bracket 170 extends through a slot 268 (FIG. 4) in the sidewall panel 80 to be manually accessible. Hence, each microfiche unit 62 may be advanced from the film pack 146 manually by adjustment of the handle 172 to advance the film unit 62 until the leading edge of the image receiving area is oriented such that Row #1 (FIG. 20) is aligned under the framing gate apertures 136. Exposure of the individual micro image areas may proceed as explained by manual depression of the actuating button 92 (assuming the camera to be mounted on the console 10 and that documents to be copied are successively positioned on the mounting glass 34) until the micro image frame at Row #7, Column G is exposed. Because of the facility for advancing the film unit manually by using the handle 172 to advance the pick slide 164 and with it, the film unit 62 behind the guide plate 98, it is not necessary that all of the micro image frames 74 on a given microfiche 62 be used. It is necessary, however, for the film unit 62 to be processed after exposure of the several micro image areas 74 thereon and preferable that the lens carriage 106 be returned to its initial starting position (Column A) in readiness for the next microfiche or film unit 62. The camera mechanism for achieving these latter functions may be understood by reference to FIGS. 9 and 17 of the drawings.

As shown most clearly in FIG. 17, a pair of processing rollers 270 are positioned adjacent a discharge opening 272 in the end wall 84 of the camera housing. The processing rollers are arranged to be driven through a gear train 274 by an electric motor 276 secured to a bracket formation 278 (FIG. 6) on the pick retainer plate 156. Although the circuitry for the electric motor 276 is not illustrated in the drawings, it is designed so that the motor will be energized upon the closure of either one of two switches 280 and 282 (FIG. 17). The switch 280 is a normally open switch positioned to be engaged and closed when the pick slide 164 reaches the forward end limit of its travel. The position of the switch 280 and length of the pick slide 164 is correlated so that when the leading end of the pick slide 164 engages and closes the switch 280, the leading end of the film unit 62 being advanced by the pick slide will be presented at the nip between the processing rollers 270. As a result of this and energization of the motor 276, the processing rollers 270 will be driven and the pressure thereof effective to rupture the processing fluid pod 72 and eject the exposed film unit 62 through the discharge opening 272.

It will be recalled from the previous description of the pick slide 164 and the brake 152 that the pick slide will be automatically retracted by engagement of the pin 180 with the post 196 on the brake. This action occurs simultaneously with closure of the switch 280.

To prevent interruption of the circuit to the motor 276, the switch 282 is closed by rotatable cam 284 incorporated in the gear train 274. The switch 282 will remain closed to maintain operation of the electric motor 276 after the switch 280 has been opened and for as long as is necessary to completely eject the film unit through the opening 272.

In addition to driving the processing rollers 270 to eject the film unit 262 from the camera, the drive motor also operates a reset mechanism by which the lens carriage 106 is returned to its initial or starting position. In this latter respect, a reset ratchet wheel 286 is coupled for rotation with the gear 218 which is linked through gears 220 and 222 with the barrel cam 114. As may be seen in FIG. 17, the ratchet wheel 286 is provided with a series of teeth 288, of which one tooth 290 is twice the length of the others. The ratchet teeth 288 are arranged to be engaged by a reciprocating return pawl 292 driven by an eccentric 294 incorporated in the gear train 274. In light of this organization, during the time that the electric motor 276 is operating, the pawl 292 will be reciprocated to rotate the ratchet 286 and the barrel cam 114 in the same direction from that in which the barrel cam was driven by the drive ratchet 214 until the double tooth 290 is in registry with the throw of the pawl 292. At that point, the pawl will no longer be effective to rotate the return ratchet wheel 286. Also, at that point, the barrel cam 114 will be positioned to locate the lens carriage 106 in its initial or starting position (i.e. Column A) and with the follower 110 at the start of a dwell sector 112a at that end of the cam track 112.

Operation of the camera 12 and the console 10 in general to microfilm a plurality of documents is believed apparent from the preceeding description. In other words, the camera 12, loaded with the film pack 146, is placed in the console mount 30 and positioned by the lugs 123 engaging in the apertures 52. Thereafter, the pick slide 164 is adjusted, using the handle 172 to bring the initial film unit 62 to a starting position. Though not shown in the drawings, the starting position may be indicated very simply by indicia on the exterior surface of the sidewall panel 80 in the region of the slot 268. Also, the apron 128 may carry indicia visible through a window (not shown) in the sidewall panel 80 so that the correlation of each document copied with a given micro image area 74 may be recorded.

Each document to be copied is placed on the document mounting glass 34 and is photographed merely by depressing the actuating button 92 on the camera 12. Specifically, as the actuating button is depressed, the drive pawl 230 engages the drive ratchet to rotate the barrel cam 114 and move the lens carriage through a lateral increment of distance corresponding to the spacing of two framing gate apertures 136 unless the carriage follower is positioned in a dwell sector 112a in the cam track 112. In the latter event, the carriage will not move and remain, for example, aligned with the image frame area 74 at Row #1, Column A. Also such depression of the actuating button 92 will move the shutter 232 to the position shown in FIG. 13. When the button 93 is released, the drive pawl 230 is retracted and the shutter 232 opened (FIGS. 14 and 15) to fire the strobe lamp 118 and expose the image frame area with which the lens 104 is aligned. A new document is placed on the glass 34 and the procedure repeated.

When all image areas 74 are exposed, the pick slide 164 will be advanced to close the switch 280 and actuate the motor 276 to process and discharge the exposed microfiche from the camera. In this respect, the opening 84 will be equipped with dark chamber (not shown) into which the exposed and processed unit 62 will be retained until the chemical interaction of the processing fluid with the photochemistry of the unit is completed. As indicated, microfilming on any given microfiche or film unit 62 may be terminated simply by advancing the pick slide 164 manually until the motor 276 is actuated by closure of the switch 280.

Figure 24:
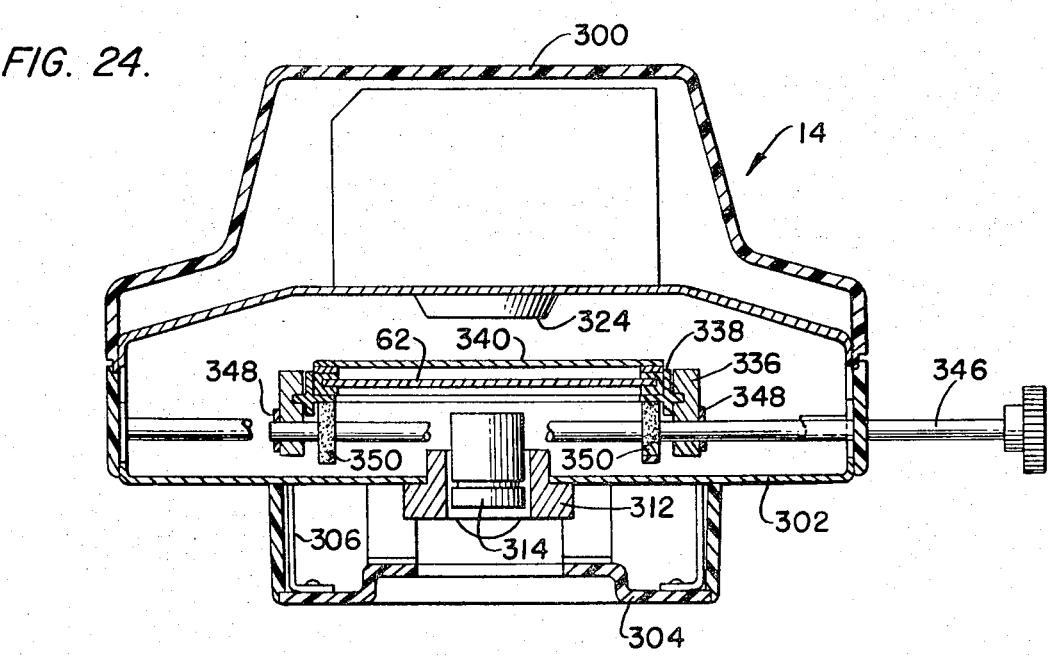
FIG. 24 is a cross-section on line 24—24 of FIG. 23.
Figure 23:
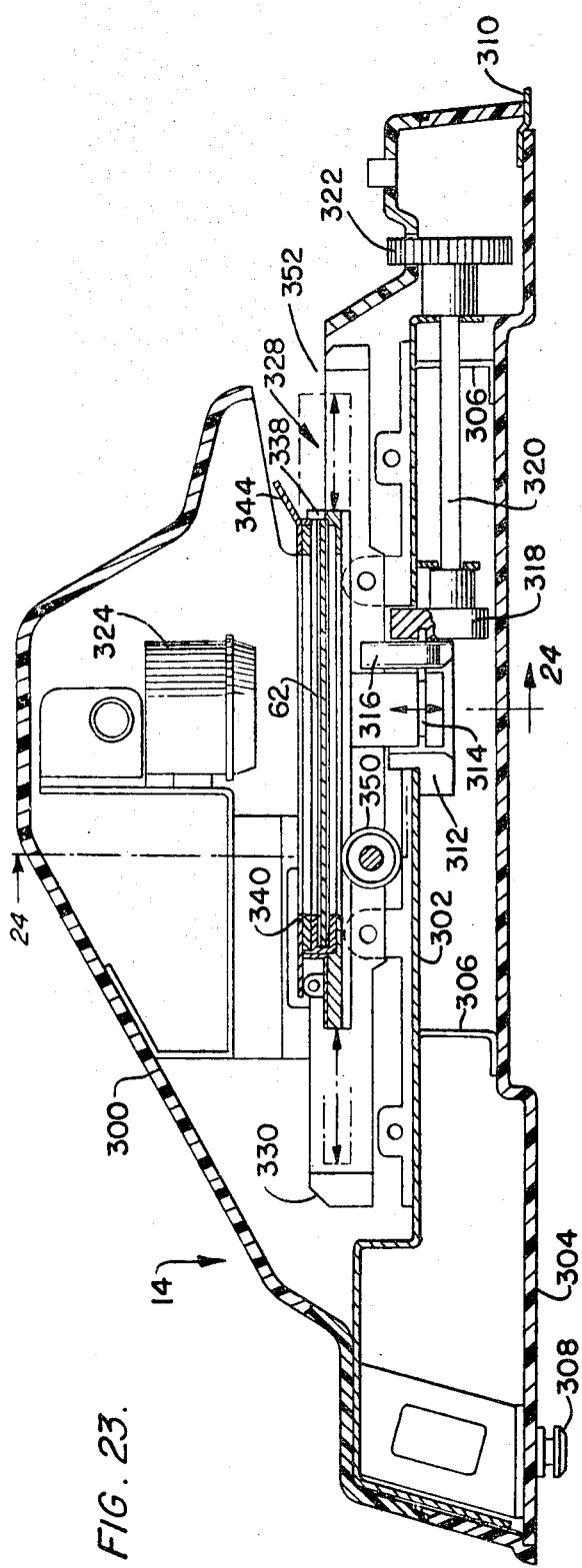
FIG. 23 is an enlarged cross-section on line 23—23 of FIG. 22.
Figure 22:
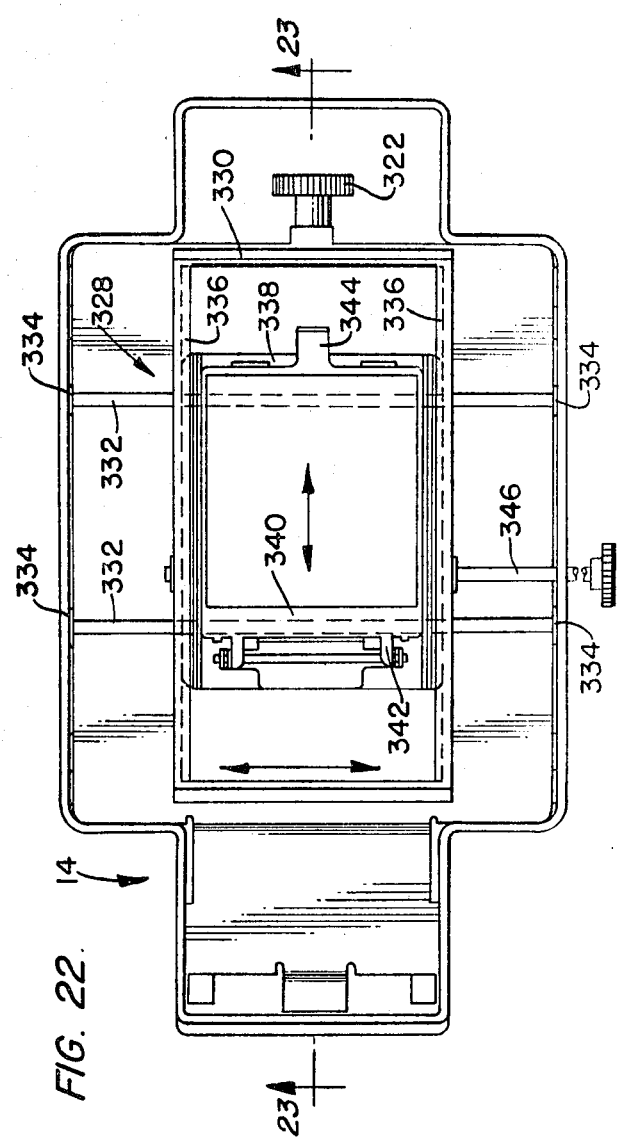
FIG. 22 is a bottom plan view of the projector with external housing components removed.

The construction and operation of the projector 14 may be understood by reference to FIGS. 2 and 22-24 of the drawings. As shown in FIGS. 22-24, the projector 14 includes an exterior housing of a configuration to establish a dome-like shell 300 closed at its base by a panel 302. A mounting base 304 extends the length of the projector and is supported from the panel 302 by depending brackets 306. A pair of mounting lugs 308 project from the base 304 in positions to register with the latching apertures 52 in the console mount 30. In addition, a tab 310 projects from the end of the base 304 opposite from the lugs 308 to engage in a recess 311 (FIG. 1) in the rear wall 48 of the console mount 30.

Interior projector components are supported from the panel 302. A lens mount 312 is secured directly to the panel 302 in an aperture located centrally thereof and carries an adjustable projection lens 314. The lens 314 is coupled by a plunger 316 with a cam wheel 318 connected by a shaft 320 to a focusing knob 322 accessible through the shell 300.

Though adjustable for focus, the axis of the lens 314 is fixed and aligned with a projection lamp 324 supported within the dome-like cavity of the shell 300. The lamp 324 is adapted to be connected with an external source of electrical power by a power cord 326 (FIG. 2).

Situated between the projection lamp 324 and the lens 314 is a microfiche carriage 328. The carriage 328 includes an elongated, transversely movable rectangular frame 330 slidably supported on a pair of guide rods 332 secured in upstanding tabs 334 on opposite sides of the support panel 308. The frame 330 thus defines a pair of parallel and longitudinal guideways 336 on opposite sides. Supported slidably by the guide rails 336 is a longitudinally movable microfiche retaining frame 338 to which a cover frame 340 is pivoted by a hinge 342. The cover frame 340 has a lift tab 344 on the end thereof opposite from the hinge 342.

Movement of the retaining frame 338 in mutually orthogonal directions is effected by a positioning knob and shaft 346 rotatable in the elongated frame 330 but secured against axial displacement with respect to the frame 330 such as by clips 348. Rotatably keyed on the shaft 46 are friction wheels 350 in a position to engage the longitudinal sides of the retaining frame 338. Thus, it will be seen that lateral or transverse movement of the microfiche carrier frame 338 is effected by axial movement of the shaft 346 whereas longitudinal movement of the carrier 338 is effected by rotation of the shaft 346.

The exterior shell 300 is provided with an access opening 352 to which the microfiche retaining frame 338 may be advanced by manipulation of the shaft 346. By grasping the tab 344 and lifting the hinged cover frame 340, the microfiche 62, previously exposed using the camera 12, may be dropped onto the frame 338 under the frame 340. The microfiche thus secured in the carriage 336 may be positioned so that any one of the micro image areas 74 will become aligned with the lens 314 and the lamp 324.

Thus, with the projector mounted on the console 10 as depicted in FIG. 2 of the drawings, the screen 36 is positioned over the mounting glass 34 and the projection lamp 324 energized an enlargement of each microfilm image 74 may be projected onto the screen 36. Registration of the image with the screen is effected very simply by adjustment of the control shaft 346 and focus controlled by the focusing knob 322.

Although use of the projector 14 with the console 10 in the manner aforementioned is desirable, it is contemplated also that the projector 14 may be used with a separate projection screen by mounting the projector in a stand (not shown). In this way, greatly enlarged images of the microfilm documents may be observed.

Thus it will be seen that as a result of the present invention, a highly effective microfiche system is provided which is compact, relatively simple and suited to low-cost manufacture, and capable of complete operation by a person having little or no knowledge of microfilming equipment. The format of the film unit 62 not only facilitates labeling on the relatively wide marginal edge 70 thereof but also the location of image carrying materials between the polyester sheets 64 and 66 prevents deterioration of the microfilmed images through use of the cards.

It is contemplated and believed to be apparent to those skilled in the art from the preceeding description and drawing illustrations, that modifications and/or changes may be made in the disclosed embodiments without meaningful departure from the invention. Accordingly, it is expressly intended that the foregoing is illustrative of preferred embodiments only, not limiting, and that the true spirit and scope of the invention be determined by reference to the appended claims.

What is claimed is:

1. A camera for exposing a plurality of image frame areas on a single card-like film unit, said camera comprising:
   means for locating the film unit at a film plane in position for exposure;
   an imaging lens;
   a lens carriage mounting said lens for incremental movement to bring said lens into imaging relation with successive image frame areas disposed in a row on the film unit;
   a shutter for defining a reclosable elongated shutter aperture extending along the length of said row to permit transmission of scene light for exposure of each of said image frame areas during an exposure interval; and
   a light shield having an aperture therein and being movable in increments with said lens carriage for maintaining said shield aperture in operative relation with said lens to thereby restrict scene light transmitted through said shutter aperture to one of said image frame areas having said lens in imaging relation therewith and block the transmission of such scene light to the other image frame areas during said exposure interval.

2. The camera of claim 1 wherein said light shield is disposed between said shutter and said carriage.

3. The camera of claim 1 wherein said shield is coupled to said carriage for movement therewith.

4. The camera of claim 3 wherein said light shield includes a flexible opaque apron secured to said carriage with said shield aperture about said lens.

5. The camera of claim 4 further including a pair of rollers at opposite ends of said apron so that said apron is wound on one of said rollers and unwound from the other of said rollers in response to movement of said apron.

6. The camera of claim 5 wherein said apron is of a prestressed resilient material so as to be self-winding and unwinding with respect to said rollers upon movement of said apron with said carriage.

7. The camera of claim 3 further including manually controlled common actuating means for operating said shutter and said carriage.

8. The camera of claim 1 further including actuating means for operating said shutter, said actuating means being manually movable from a first position to a second position and being biased for automatic return to said first position upon manual release thereof and wherein said shutter includes an opening blade having an elongated opening therein and being coupled to said actuating means for movement from an initial position to a cocked position in response to movement of said actuating means from said first to said second position and being returnable to said initial position in response to the return of said actuating means to said first position, a closing blade having an elongated opening therein and being biased independently of said opening blade to said initial position wherein said blade openings do not overlap to provide a closed shutter condition, means for coupling said closing blade to said opening blade for movement therewith from said initial position to said cocked position in said closed shutter condition wherein said opening of said closing blade is aligned with said row of image frame areas, means for releasably latching said closing blade in said cocked position so that said opening blade may move relative to said closing blade toward said initial position and locate said opening of said opening blade in registered relation with said opening of said closing blade to define said shutter aperture for effecting exposure of an image frame area, and means on said opening blade for releasing said latch means when said opening blade returns to said initial position to free said closing blade for return to said initial position to terminate exposure.

9. The camera of claim 8 wherein said opening and closing blades move in a direction that is substantially transverse to the direction of movement of said carriage.

10. The camera of claim 8 further including a source of exposure illumination, a normally open switch configured to be closed to operate said illumination source and means on at least one of said blades for closing said switch when said blade openings are in registration to define said shutter aperture.

* * * * *

UNITED STATES PATENT AND TRADEMARK OFFICE
CERTIFICATE OF CORRECTION

PATENT NO. : 4,235,545

DATED : November 25, 1980

INVENTOR(S) : Philip R. Norris

It is certified that error appears in the above—identified patent and that said Letters Patent is hereby corrected as shown below:

On The Title Page Insert:

--(73) Assignee: Polaroid Corporation, Cambridge, Mass. --.

Signed and Sealed this

Twenty-sixth Day of May 1981

[SEAL]

*Attest:*

RENE D. TEGTMEYER

*Attesting Officer*   *Acting Commissioner of Patents and Trademarks*